United States Patent

Loewenthal

Patent Number: 5,450,941
Date of Patent: Sep. 19, 1995

[54] APPARATUS FOR SEPARATING, CONVEYING AND GROUPING FLAT ITEMS

[75] Inventor: Horst Loewenthal, Tiengen, Germany

[73] Assignee: SIG Schweizerische Industrie-Gesellschaft, Neuhausen am Rheinfall, Switzerland

[21] Appl. No.: 264,957

[22] Filed: Jun. 24, 1994

[30] Foreign Application Priority Data

Jun. 25, 1993 [CH] Switzerland ............ 1913/93

[51] Int. Cl.$^6$ ................................ B65G 57/32
[52] U.S. Cl. .................. 198/418.5; 198/418.4
[58] Field of Search .......... 414/791; 198/418.4, 198/418.5, 418.6

[56] References Cited

U.S. PATENT DOCUMENTS 2,872,020  2/1959  Hansel et al. .
4,181,213  1/1980  Deutschlander et al. ........ 198/418.5
4,413,462  11/1983  Rose ........................ 53/540

FOREIGN PATENT DOCUMENTS 0521428  1/1993  European Pat. Off. .
241124  6/1946  Switzerland .

*Primary Examiner*—Robert J. Oberleitner
*Assistant Examiner*—Janice L. Krizek
*Attorney, Agent, or Firm*—Spencer, Frank & Schneider

[57] ABSTRACT

An apparatus for separating, conveying and grouping flat items includes a supply chute for advancing the items in a face-to-face orientation in a series of indeterminate length; a conveying track adjoining the supply chute for receiving items therefrom; a grouping device disposed on the conveying track for forming a group of vertically stacked items of predetermined number; and a conveyor for advancing the items on the conveying track. The conveyor has sequentially spaced item pushers each advancing the items to the grouping device from the supply chute. Some of the item pushers are placed in an inoperative state at the grouping device to allow items to remain therein and be stacked to attain an item group having the predetermined number of items.

13 Claims, 4 Drawing Sheets

APPARATUS FOR SEPARATING, CONVEYING AND GROUPING FLAT ITEMS

BACKGROUND OF THE INVENTION

This invention relates to an apparatus for separating, conveying and grouping flat items, particularly confectionery products such as biscuits, cookies or the like. The apparatus has a separating unit to which the items are advanced through a supply chute in a face-to-face arranged series of indeterminate length. The apparatus has a first conveyor which advances items to a grouping unit and a second conveyor which advances groups of items to a packing machine in a direction transverse to the item-advancing direction of the first conveyor.

In the packaging industry often machines are used to separate flat items from one another, particularly cookies or other food products which are fed to such a machine from a supply chute in which the items are in a face-to-face orientation and form an item series of indeterminate length. The machine separates such articles, groups them and advances the groups for further processing, such as wrapping in a packing machine.

SUMMARY OF THE INVENTION

It is an object of the invention to provide an improved apparatus of the above-outlined type which has a high output rate.

This object and others to become apparent as the specification progresses, are accomplished by the invention, according to which, briefly stated, the apparatus for separating, conveying and grouping flat items includes a supply chute for advancing the items in a face-to-face orientation in a series of indeterminate length; a conveying track adjoining the supply chute for receiving items therefrom; a grouping device disposed on the conveying track for forming a group of vertically stacked items of predetermined number; and a conveyor for advancing the items on the conveying track. The conveyor has sequentially spaced item pushers each advancing the items to the grouping device from the supply chute. Some of the item pushers are placed in an inoperative state at the grouping device to allow items to remain therein and be stacked to attain an item group having the predetermined number of items.

It is an advantage of the apparatus according to the invention that it has a markedly compact construction and therefore its operation may be readily monitored and serviced in a simple manner.

DESCRIPTION OF THE PREFERRED EMBODIMENT

Figure 1:
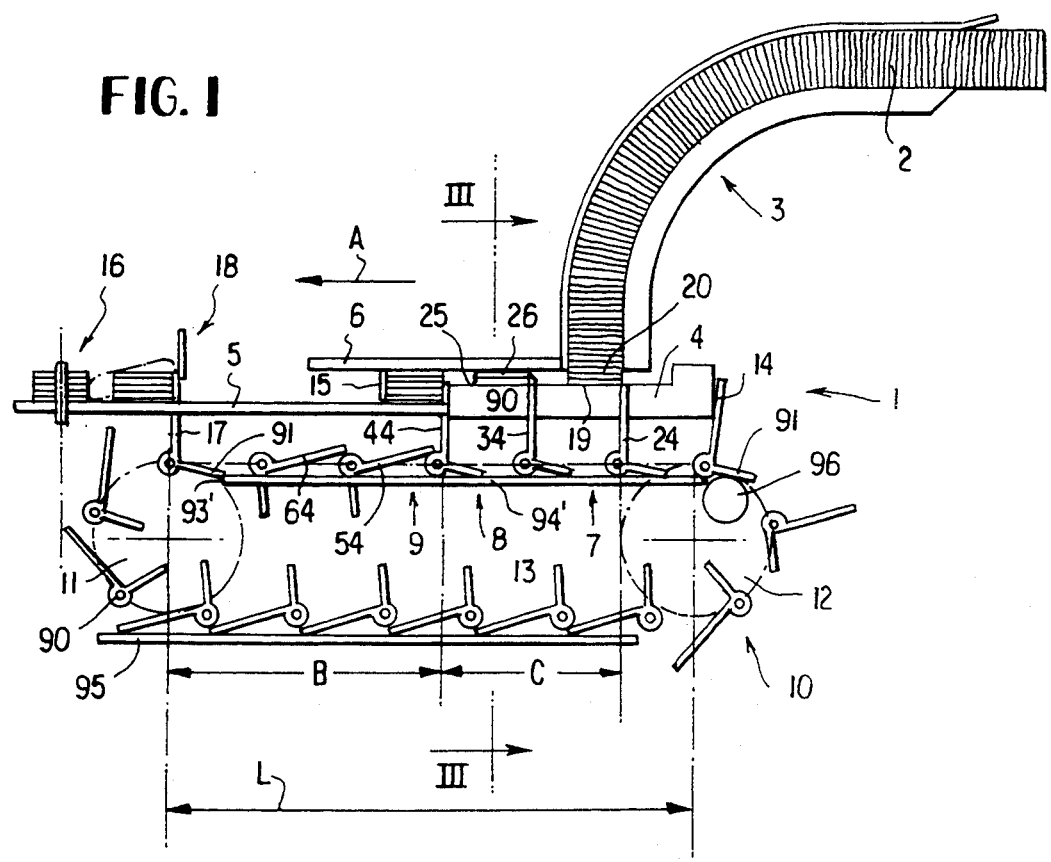
FIG. 1 is a schematic side elevational view of a preferred embodiment of the invention.

Turning to FIG. 1, the apparatus 1 shown therein has a supply chute 3 filled with flat items (such as cookies) 2 and is curved such that the items which are in a vertical, face-to-face orientation at the inlet of the supply chute, undergo a change of direction determined by the curvature of the chute so that at the outlet of the chute they are ejected in a horizontal, vertically stacked orientation. The items are discharged onto a supporting surface formed of two parallel rails 4 (only one is visible in FIG. 1). At the downstream end of the rails 4 (as viewed in the item feeding direction A) respective bars 5 (only one is visible) are arranged end-to-end which serve as a continuation of rails 4. Rails 4 and bars 5 together constitute a conveying track. The supporting or carrying face of the bars 5 is situated at a lower level than that of the rails 4. Above each rail 4 and bar 5 a respective longitudinal hold-down bar 6 is provided.

The clearance between a rail 4 and the associated hold-down bar 6 allows passage on the rails 4 of, for example, 1–3 vertically stacked items and the clearance between a support bar 5 and the associated hold-down bar 6 is such that it allows a passage of, for example, 5–10 items.

FIG. 1 shows the items in three positions 7, 8 and 9 in the zone of the rails 4 and the hold-down members 6. The position 7, which is the location where the supply chute 3 discharges, through its output end, items onto the input end of the conveying track 4, 5, corresponds to a separating station while the position 9 corresponds to a grouping station.

The rail 4 and the associated bar 5 are situated at a distance above a conveying mechanism which includes a transporting device 10 formed of an endless conveyor chain 13 trained about two end rolls 11 and 12 and carrying a plurality of spaced item pushers 14, 24, 34 . . . . The total length of the rail/bar assembly is preferably greater than the distance L between the rotary axes of the end sprockets 11 and 12. The upstream sprocket 12 (as viewed in the direction of article advance on the conveying track 4, 5) is situated below and upstream of the supply chute 3. The pushers 14, 24, 34 . . . are mounted longitudinally spaced on the endless carrier chain 13; at least some of the pushers such as 54, 64 are pivotally mounted.

Figure 2:
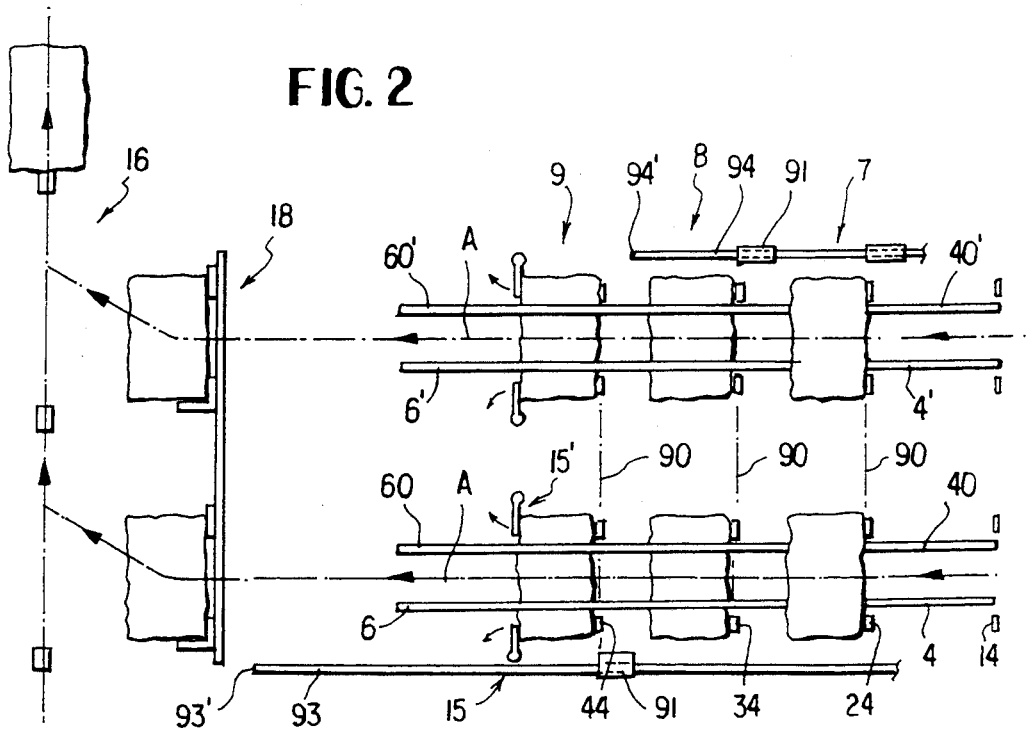
FIG. 2 is a schematic top plan view of one part of the construction shown in FIG. 1.

FIG. 2 shows an apparatus for two supply chutes (removed for the sake of clarity); accordingly, there are provided a first pair of rails 4, 40 and, parallel spaced therefrom, a second pair of rails 4', 40'. A first pair of hold-down bars 6, 60 is associated with the first rail pair and a second pair of hold-down bars 6', 60' is associated with the second rail pair.

In the position 7 there are situated two superposed rectangular items which lie on rails 4, 40 and 4', 40', respectively. In the position 8 there are situated two superposed items which are guided between the rails 4, 40 and 4', 40' on the one hand and hold-down members 6, 60 and 6', 60' on the other hand. In the position 9 there are situated four superposed rectangular items which are guided between the bars 5 (shown in FIG. 1 but not shown in FIG. 2) and the hold-down members 6, 60 and 6', 60'.

In FIG. 2 the working tips (item-engaging portions) of the item pusher 14 and further item pushers 24, 34, 44 are visible. The respective tips engage the items at their trailing edge and push them forward in the direction of the arrow A. In the position 9 stop members 15, 15' are provided which are pivotal about an axis perpendicular to the plane of conveyance of the items. Thus, the stop members may be pivoted into the path of travel of the items to retain the items in the position 9 for a predetermined period by abutting their leading edge until a full item group has been completed. To simplify the illustration, in FIG. 2 the conveyor chain 13 of FIG. 1 is not illustrated; it is situated underneath the rails 4, 40, 4', 40' and the bars 5.

Also referring to FIG. 1, in a zone above and downstream of the sprocket 11 a transverse conveyor 16 is provided which advances the items to a non-illustrated packing machine. For transferring the items to the transverse conveyor 16, preferably two variants are provided. In the first variant the transfer may be effected by the earlier-described article pushers themselves, for example, the article pusher 17. In the variant according to FIGS. 1 and 2, the item transfer is effected with the aid of a separate transfer pusher 18. According to a preferred subvariant the transfer pusher 18 describes the following motions: first, it is displaced in an upward direction from the left to the right, as viewed in FIG. 1, up to a height which is above the level of the stacked items; second, it moves downwardly behind the item group; third, it moves forwardly to push the group in a forward direction; and fourth, in the lower plane it continues to move forward, but at an angle to the first conveying direction and then moves backward.

According to a simple subvariant the pusher 18 needs to perform only the first, second and third displacement steps.

Figure 3:
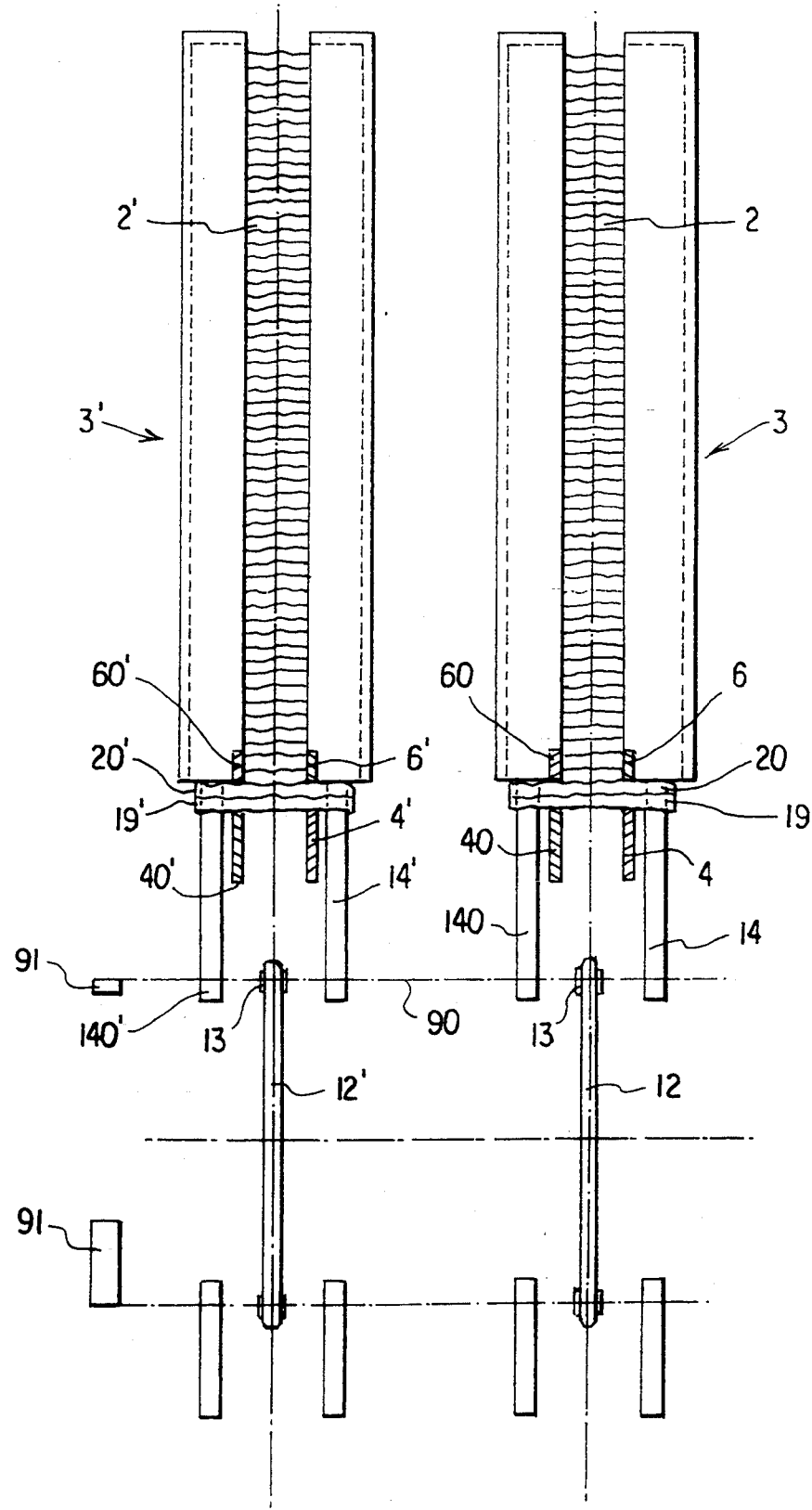
FIG. 3 is a sectional view taken along line III—III of FIG. 1.

In FIG. 3, there are illustrated two parallel supply chutes 3, 3' with items 2, 2' therein. The sprockets 12, 12' support a non-illustrated endless conveyor chain on which article pushers such as pushers 14, 140, 14', 140' are arranged. Between the rails 4, 40 and the hold-down bars 6, 60 there are positioned two superposed items 19 and 20 which may be advanced by pushers 14 and 140. Between the rails 4', 40' and hold-down bars 6', 60' two superposed items 19' and 20' are located which are advanced by pushers 14' and 140'. As seen in FIGS. 2 and 3, the article pushers move in a plane which is parallel to the symmetry plane of the rails or the bars and the rails or bars are situated in the space bounded by oppositely located pushers of the same chain.

In the description which follows, the operation of the apparatus described above in conjunction with FIGS. 1, 2 and 3 will be set forth.

The item pushers move in the upper run of the endless conveyor chain 13 from the right to the left as viewed in FIGS. 1 and 2. These Figures depict the phase when the item pusher 24 in the position 7 pushes two stacked items 19, 20 between the rails 4, 40 and the hold-down bars 6, 60. Similarly, in the position 8, the item pusher 34 pushes two stacked items 25, 26 towards the left. In the position 9 the items drop from the supporting surface of the rails 4, 40 onto the supporting surface of the bars 5. In the position 9 two item pushers 54, 64 have been consecutively pivoted rearwardly out of their operative position, so that they do not perform any displacing function to allow the items to stack up in station 9. In position 9 the item group is held back by the stops 15, 15' until the group is fully constituted by six items. Upon such an occurrence, the stops 15, 15' are pivoted away laterally to permit a further displacement of the items which are displaced by an item pusher 44 which arrives into and travels beyond the grouping station 9 in an upwardly pivoted, operative (item-engaging) position.

Thus, generally, each item pusher is in its working (upwardly-pivoted, item-engaging) position to push items from the supply chute 3 to the grouping station (position) 9. There the items are stopped by the stop members 15, 15' pivoted into their working position and simultaneously, the item pusher is pivoted into its withdrawn position on travelling chain 13 to allow the items to remain and accumulate in station 9. When the desired number of items is reached to complete the group, the item pusher which carried the items that completed the group remains in its working position, the stop members 15, 15' are pivoted out of their working position, so that the completed item group is pushed out of the grouping station 9 and carried to the transverse conveyor 16 or, if a transfer pusher 18 is provided, then to the transfer pusher 18. Preferably, the distance between the beginning of the transfer path (from bars 5 to the transverse conveyor 16) and the upstream end of bars 5 is greater than the distance C between the upstream end of the bars 5 and the distance B is greater than the distance between two consecutive item pushers which are generally designated as separating means.

Figure 3A:
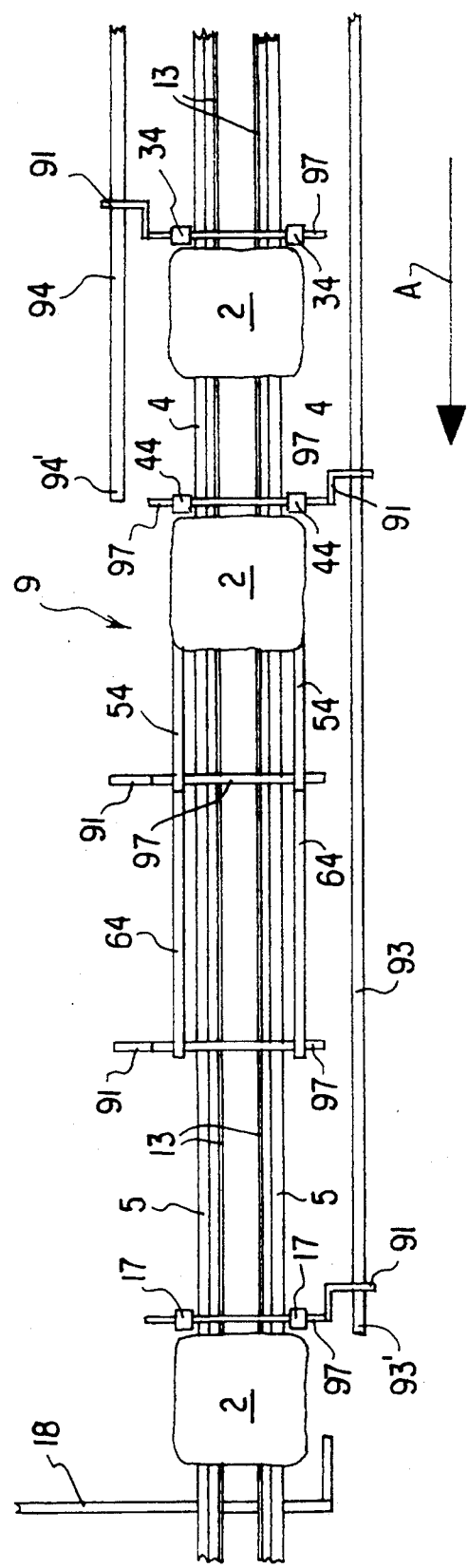
FIG. 3a is a schematic fragmentary top plan view of a variant of the preferred embodiment.

FIGS. 2, 3 and 3a illustrate an exemplary mechanism with which consecutive item pushers are either withdrawn into an inoperative position as they reach the grouping station 9 or they are maintained in their operative (item pushing) position throughout their effective travel path, that is, from the supply chute 3 (position 7) to the transfer pusher 18.

If, for example, it is desired that from the grouping station 9 in each instance a group of six stacked items be supplied to the transfer pusher 18 and the mechanism as well as the item heights are dimensioned such that from the station 7 in each instance two superimposed items are advanced by the article pushers towards the grouping station 9, then every third item pusher will remain in its operative position beyond the grouping station 9 to push out the group of accumulated six articles from the grouping station 9 toward the transfer pusher 18. Such a distribution of selectively withdrawn and non-withdrawn item pushers is best shown in FIGS. 1 and 3a where the item pushers 14, 17 and 44 carry the completed group of items from the grouping station 9 towards the transfer pusher 18 whereas the item pushers 24, 34, 54 and 64 are withdrawn into their inoperative position once they have each deposited two superposed items in the grouping station 9.

Each item pusher is mounted on the carrier chain 13 by means of a pivot shaft 97. With particular reference to FIG. 3a, on either side of the conveying track 4, 5 a respective guide track rail 93 and 94 is positioned; both extend parallel to the conveying track 4, 5. The guide track 94 has an end 94' which is situated in alignment with the grouping station 9, whereas the guide track 93 is longer; it has an end 93' which terminates at the transfer device 18.

To the pivot shaft 97 of the item pushers 14, 17 and 44 (the item pusher 14 is not visible in FIG. 3a) a follower arm 91 is secured which extends over the guide track 93. Thus, as long as the follower arm 91 rides (for example, by means of a roller) on the guide track 93, the item pushers 14, 17 and 44 are prevented by the guide track 93 from pivoting into their inoperative position.

To the pivot shaft 97 of the item pushers 24, 34, 54 and 64, on the other hand, a follower arm 91 is secured which extends over the shorter guide track 94 (the item pusher 24 is not visible in FIG. 3a), and rides thereon (for example, with the interposition of a roller).

It is thus seen that the item pushers 24, 34, 54 and 64, or, stated differently, all the item pushers which are provided with a follower arm 91 that cooperates with the shorter guide track 94 will be allowed, immediately beyond the end 94' of the guide track 94, to pivot into their inoperative position. Such pivoting will take place by virtue of the gravity and also by the rearward force (reaction force to the conveying force) exerted by the advanced items. In contrast, the item pushers 14, 17 and 44, that is, all the item pushers whose pivot shaft 97 is provided with a follower arm 91 cooperating with the longer guide track 93, will remain in their item pushing state and thus will move the item group out of the grouping station 9 towards the transfer pusher 18.

Both guide tracks 93 and 94 have an upstream end 96 (FIG. 1) which is situated ahead of the supply chute 3 and which positions all the item pushers into their upstanding, operational position in which they advance articles from the end of the supply chute 3 on the track 4 to the grouping station 9. Thus, the ends 93', 94' as well as 96 of the guide tracks 93, 94 serve as switching elements for switching the items pushers between the operative (active) and inoperative (inactive) positions.

To provide for a flexibility of the apparatus, each follower arm 91 may be readily removed from one end of the respective pivot shaft 97 and mounted on the other end thereof to thus switch guide tracks. In this manner, any particular pusher, while, for example, in one application remains throughout its working travel in the operative (item pushing) position, in another application, by switching the follower arm 91 to the other end of the pivot shaft 97, may be converted to an item pusher which is withdrawn at the grouping station 9 in a manner described above.

Additional guides 95 may be provided below the lower run of the chain or chains 13.

Figure 4:
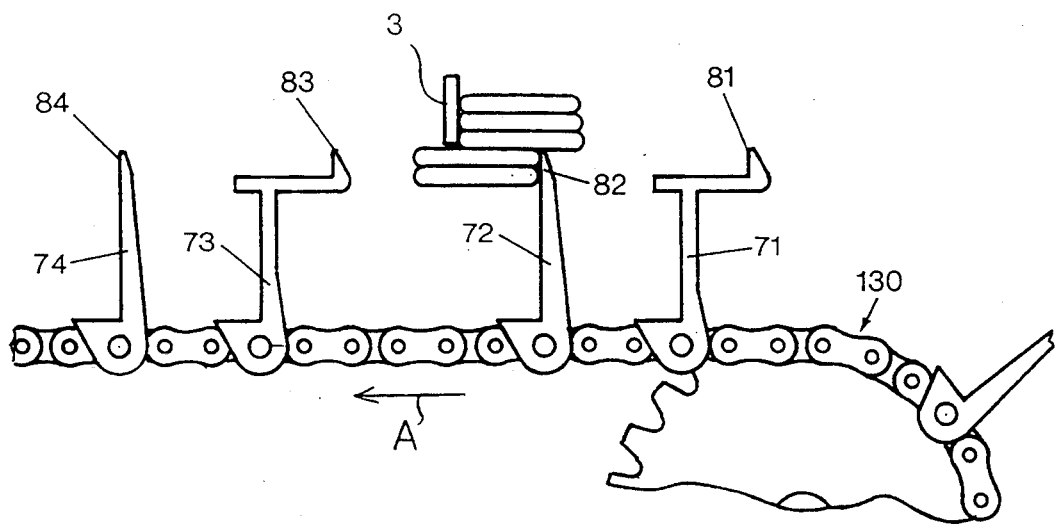
FIG. 4 is an enlarged fragmentary schematic side elevational view of some of the components of the preferred embodiment.

FIG. 4 illustrates an embodiment in which, for example, the item pushers 71, 72, 73 and 74 have alternatingly different structures such that every other pusher 71, 73 is, by means of a deactivating mechanism or lowering members, pivoted downwardly to prevent them from operating. Also, activating means may be provided to return these item pushers or separating means into their working position before they reach the separating station 7 at the beginning of their successive operating cycle. The item pushers 71 and 73 are pivotal and the item pushers 72 and 74 are non-pivotal on the conveyor chain 130.

In the embodiment according to FIG. 4, the item pushers are of different configuration yet so designed that the distance between two consecutive operating (item-engaging) points 81, 82, 83 and 84 of the item pushers 71, 72, 73 and 74 is identical in the working position although the item pushers are connected to the conveyor chain 130 at different distances from one another. Such an arrangement causes the mechanism to determine the criterion for lowering or not lowering the respective item pusher.

It will be understood that the above description of the present invention is susceptible to various modifications, changes and adaptations, and the same are intended to be comprehended within the meaning and range of equivalents of the appended claims.

What is claimed is:

1. An apparatus for separating, conveying and grouping flat items, comprising
    (a) a supply chute for advancing the items in a face-to-face orientation in a series of indeterminate length; said supply chute having an output end;
    (b) a conveying track having an input end and an output end; said input end of said conveying track adjoining said output end of said supply chute for receiving items from said supply chute; said conveying track having an advancing direction for the items;
    (c) grouping means disposed on said conveying track downstream of said input end as viewed in said advancing direction for forming a group of vertically stacked items of predetermined number;
    (d) item-conveying means for advancing the items on said conveying track from said input end to said output end thereof; said item-conveying means comprising a plurality of item pushers; a first number of said item pushers advancing the items to said grouping means and a second number of said item pushers advancing the item groups from said grouping means to said output end of said conveying track; each said item pusher having an item-engaging portion; a distance between the item-engaging portions of two adjoining item pushers belonging to the first number of item pushers being less than a distance between the item-engaging portions of two adjoining item pushers belonging to the second number of item pushers;
    (e) transporting means for moving the article groups away from said output end of said conveying track; and
    (f) a hold-down bar supported above and parallel to said conveying track; the items being advanced between said conveying track and said hold-down bar.

2. The apparatus as defined in claim 1, further comprising transfer means for placing the items from said output end of said conveying track on said transporting means.

3. The apparatus as defined in claim 2, further wherein said transfer means includes means for pushing the items from said output end of said conveying track perpendicularly to said advancing direction.

4. An apparatus for separating, conveying and grouping flat items, comprising
    (a) a supply chute for advancing the items in a face-to-face orientation in a series of indeterminate length; said supply chute having an output end;
    (b) a conveying track having an input end and an output end; said input end of said conveying track adjoining said output end of said supply chute for receiving items from said supply chute; said conveying track having an advancing direction for the items;
    (c) grouping means disposed on said conveying track downstream of said input end as viewed in said advancing direction for forming a group of vertically stacked items of predetermined number; and
    (d) item-conveying means for advancing the items on said conveying track from said input end to said output end thereof; said item-conveying means comprising sequentially spaced item pushers travelling along said conveying track from said input end to said output end thereof and forming a first group constituted by a totality of said item pushers and a second group constituted by a part of said totality; each said item pushers of said first group having an operative position for displacing items from said input end of said conveying track to said grouping means; each said item pushers of said second group having an inoperative position which they assume at said grouping means for allowing items advanced into said grouping means to remain therein and be stacked to attain an item group having said predetermined number of items.

5. The apparatus as defined in claim 4, further comprising deactivating means for placing said item pushers of said second group into said inoperative position.

6. The apparatus as defined in claim 4, further comprising activating means for placing said item pushers of said second group into said operative position before said item pushers of said second group reaches said input end of said conveying track.

7. An apparatus for separating, conveying and grouping flat items, comprising
  (a) a supply chute for advancing the items in a face-to-face orientation in a series of indeterminate length; said supply chute having an output end;
  (b) a conveying track having a conveying surface, an input end and an output end; said input end of said conveying track adjoining said output end of said supply chute for receiving items from said supply chute; said conveying track having an advancing direction for the items;
  (c) grouping means disposed on said conveying track downstream of said input end as viewed in said advancing direction for forming a group of vertically stacked items of predetermined number; said grouping means comprising a drop in level of said conveying surface to allow items to fall from a higher level of said conveying track to a lower level thereof;
  (d) item-conveying means for advancing the items on said conveying track from said input end to said output end thereof; said item-conveying means comprising a plurality of item pushers; a first number of said item pushers advancing the items to said grouping means and a second number of said item pushers advancing the item groups from said grouping means to said output end of said conveying track; each said item pusher having an item-engaging portion; a distance between the item-engaging portions of two adjoining item pushers belonging to the first number of item pushers being less than a distance between the item-engaging portions of two adjoining item pushers belonging to the second number of item pushers;
  (e) transporting means for moving the article groups away from said output end of said conveying track; and
  (f) item-retaining means at the level drop for preventing items to be advanced from said level drop until a group of predetermined items is formed as the items fall and stack on one another.

8. The apparatus as defined in claim 7, further comprising transfer means for placing the items from said output end of said conveying track on said transporting means.

9. The apparatus as defined in claim 8, further wherein said transfer means includes means for pushing the items from said output end of said conveying track perpendicularly to said advancing direction.

10. The apparatus as defined in claim 7, wherein a length portion of said conveying surface of said conveying track extending from said grouping means to said output end of said conveying track is planar.

11. The apparatus as defined in claim 10, further comprising deactivating means for moving at least every other item pusher into an inoperative position between said grouping means and said output end of said conveying track for allowing items to be stacked by said grouping means.

12. The apparatus as defined in claim 11, wherein said deactivating means includes means for engaging one part of said at least every other item pusher.

13. The apparatus as defined in claim 11, further comprising activating means for moving said at least every other item pusher into an operative position at a location upstream of said input end of said conveying track, as viewed in said advancing direction.

* * * * *